H. H. HUFFMAN.
PNEUMATIC TIRE WHEEL RIM.
APPLICATION FILED MAY 26, 1917.

1,283,520.  Patented Nov. 5, 1918.

Inventor
Henry H. Huffman
Attorneys

UNITED STATES PATENT OFFICE.

HENRY H. HUFFMAN, OF COLUMBUS, OHIO.

PNEUMATIC-TIRE WHEEL-RIM.

1,283,520.

Specification of Letters Patent.

Patented Nov. 5, 1918.

Application filed May 26, 1917. Serial No. 171,081.

*To all whom it may concern:*

Be it known that I, HENRY H. HUFFMAN, a citizen of the United States, residing at Columbus, in the county of Franklin and State of Ohio, have invented a certain new and useful Improvement in Pneumatic-Tire Wheel-Rims, of which the following is a specification.

This invention relates more particularly to motor car wheels having removable flange rings for pneumatic tires and has for its principal object to simplify such rings so that they may be conveniently manufactured and be easily applied. Other objects will appear from the following description. The features of novelty are pointed out in the claim.

In the accompanying drawing—

Figure 1:
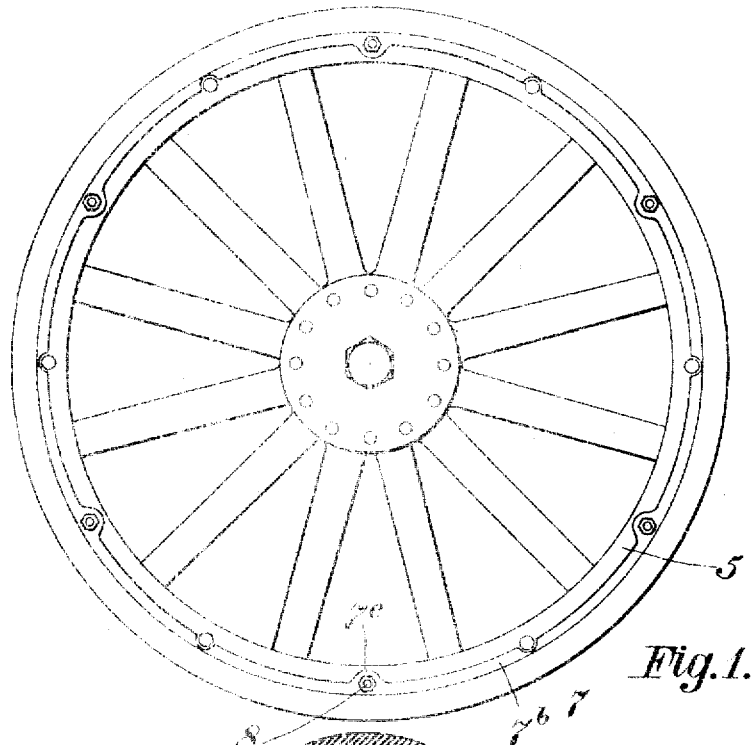
Figure 1 is a wheel equipped with my invention.
Figure 2:
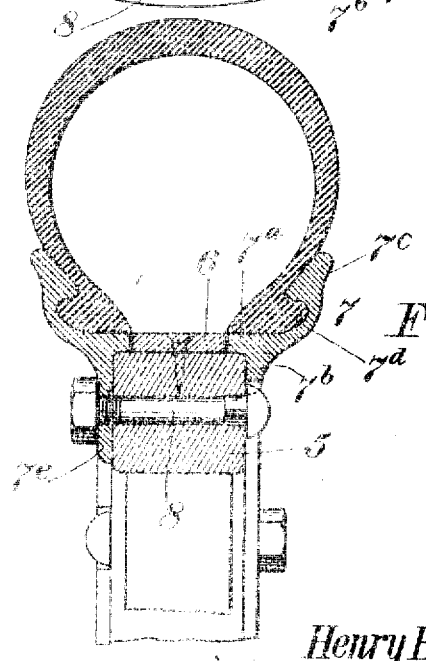
Fig. 2 is a cross section of the rim on a larger scale.

The body of the wheel is of ordinary construction and includes a wooden felly 5. Upon the felly is suitably secured a metallic felly band 6 of less width than the periphery of the felly so as to leave a portion of the felly periphery exposed at each side thereof all the way around. 7 designates, generally, the removable flange ring which in the present invention is of peculiar construction in that it has a laterally projecting tongue 7ª or flange that is flush with the metal felly band 6 and fits over the periphery of the felly and a vertical lip 7ᵇ that fits on the side of the felly. The tongue 7ª takes the rolling thrust of the ring and relieves the fastening bolts of strain and vertical pressure. The flange ring also has a broad outwardly flaring surface 7ᶜ beyond the clencher groove 7ᵈ. This broad flaring surface lessens the liability to rim cutting. The flange rings 7 at opposite sides of the wheel are identical in form and size and are therefore interchangeable, either fitting on either side of the wheel. This identity of form and size of the flange rings promotes economy in manufacture and avoids confusion in the application of the rings to the wheel. The lip 7ᵇ is provided with perforated ears 7ᵉ through which the fastening bolts 8 are passed.

In equipping a wheel with my flanges I pierce the felly with an even number of holes for the bolts and reverse the position of the successive bolts around the felly. The flange ring 7 on that side of the wheel adjacent the chassis is secured by bolts having their heads located on and engaging the outer side of the felly while the corresponding ring on the outer side of the wheel is secured by bolts having their heads located on the inner side of the wheel with the nuts on the outer side of the wheel. The inner flange ring by this arrangement in ordinary use and practice might be termed the permanent flange while the outer flange is the removable one. Of course, the inner ring can be removed by the driver as when remote from repair facilities and a tire becomes hopelessly punctured or blown out and it is desired to return home without running on a deflated tire. When both flanges are removed the wheel can be driven on the iron felly band 6 without injury at all.

The invention is not confined in its use to pneumatic tires, nor is the invention confined to the precise forms of the parts shown.

What I claim is—

In combination with a wheel having a felly, of tire receiving flange rings fitted to the opposite sides of the felly, said flange rings having a series of lips engaging the sides of the felly and arranged out of alinement on opposite sides thereof and a plurality of fastening means each engaging a lip on one side of the felly and the surface of the felly between the lips on the opposite side of the felly.

HENRY H. HUFFMAN.